C. R. PFLAGING.
POWER PLANT FOR AEROPLANES.
APPLICATION FILED MAY 31, 1910.

1,124,652.

Patented Jan. 12, 1915.
5 SHEETS—SHEET 1.

Witnesses

Inventor
Charles R. Pflaging,
By
Attorneys

C. R. PFLAGING.
POWER PLANT FOR AEROPLANES.
APPLICATION FILED MAY 31, 1910.

1,124,652.

Patented Jan. 12, 1915.
5 SHEETS—SHEET 2.

Witnesses

Inventor
Charles R. Pflaging,
By
Attorneys

UNITED STATES PATENT OFFICE.

CHARLES R. PFLAGING, OF BALTIMORE, MARYLAND.

POWER PLANT FOR AEROPLANES.

1,124,652.  Specification of Letters Patent.  Patented Jan. 12, 1915.

Application filed May 31, 1910. Serial No. 564,271.

*To all whom it may concern:*

Be it known that I, CHARLES R. PFLAGING, a citizen of the United States, residing at Baltimore, in the county of Baltimore City, State of Maryland, have invented certain new and useful Improvements in Power Plants for Aeroplanes; and I do hereby declare the following to be a full, clear, and exact description of the invention, such as will enable others skilled in the art to which it appertains to make and use the same.

This invention relates to aeroplanes and has special reference to a power plant for such devices.

It is a well understood fact that one of the greatest difficulties experienced in the operation of heavier than air flying machines is due to the fact of uncertain working of the motors used to run the propellers. When a motor stops it is impossible to start the same a second time while in the air and as a result a landing must be made. If the machine is sufficiently high this may be accomplished with safety but when flying low the time of descent is too short to allow of a suitable landing being selected and the result is usually disastrous.

The principal object of the present invention is to provide a power plant consisting of a plurality of motors so arranged that any mishap which may occur to what may be preferably termed the main motor will immediately bring into service an auxiliary motor.

Another object of the invention is the provision of means whereby a pair of motors may be run, one normally loaded and the other normally unloaded, the means acting to automatically shift the load from the normally loaded motor to the normally unloaded motor whenever the loaded motor varies beyond either a predetermined high speed or a predetermined low speed.

With the above and other objects in view, the invention consists in general of a pair of motors arranged to be operated simultaneously, one of the motors being normally loaded and the other normally unloaded, in combination with means for automatically shifting the load to the normally unloaded motor when the normally loaded motor varies beyond certain predetermined speeds.

The invention further consists in certain novel details of construction and combinations of parts hereinafter fully described, illustrated in the accompanying drawings, and specifically set forth in the claims.

In the accompanying drawings, like characters of reference indicate like parts in the several views, and: Fig. 3 is an elevation from the right hand side of such a power plant.

Figure 1:
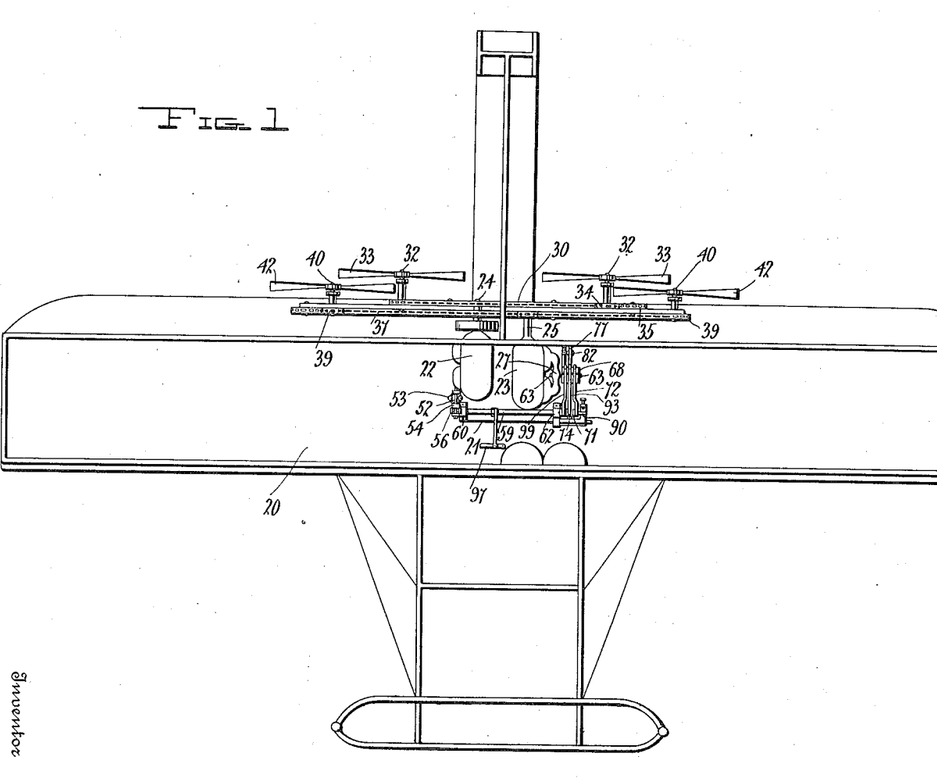
—Figure 1 is a diagrammatic view of an aeroplane equipped with a power plant arranged in accordance with this invention.
Figures 2, 11:
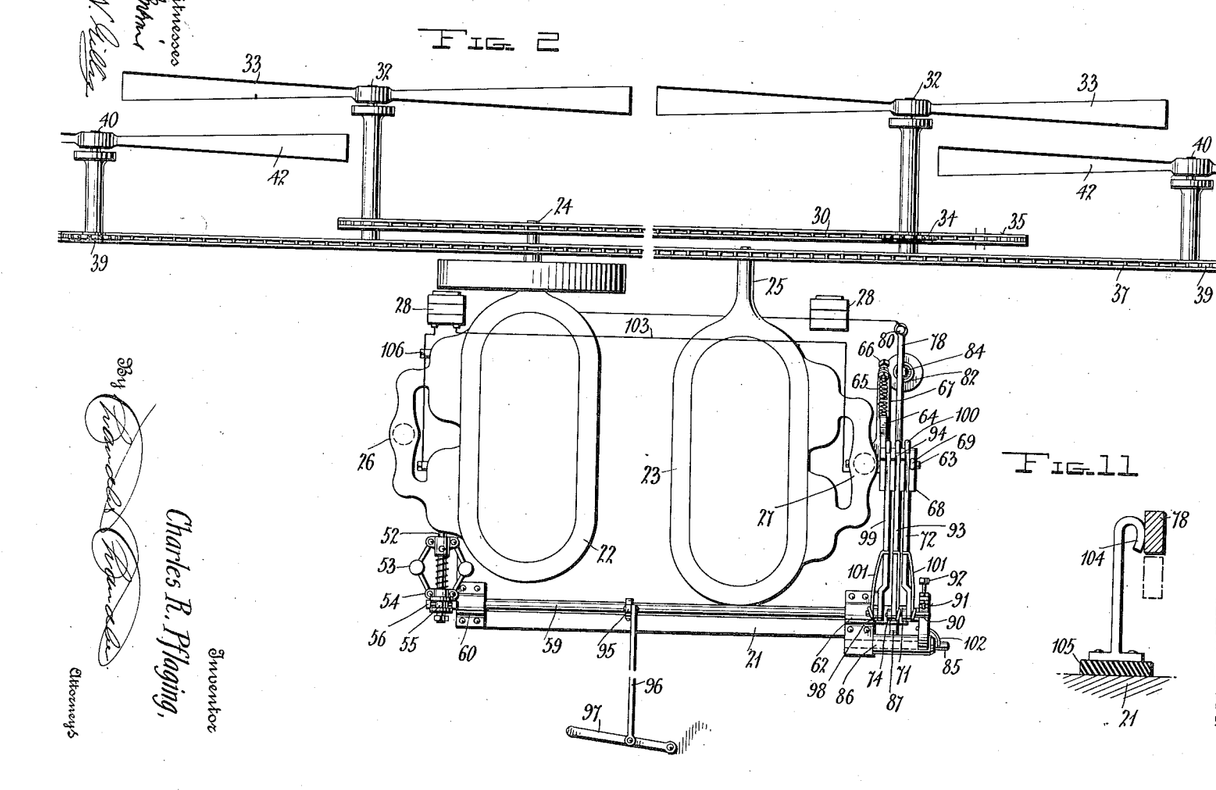
Fig. 2 is a plan view of the power plant removed from the aeroplane.
Fig. 11 is an enlarged detail of a certain circuit breaker used in connection with this invention.
Figure 2:
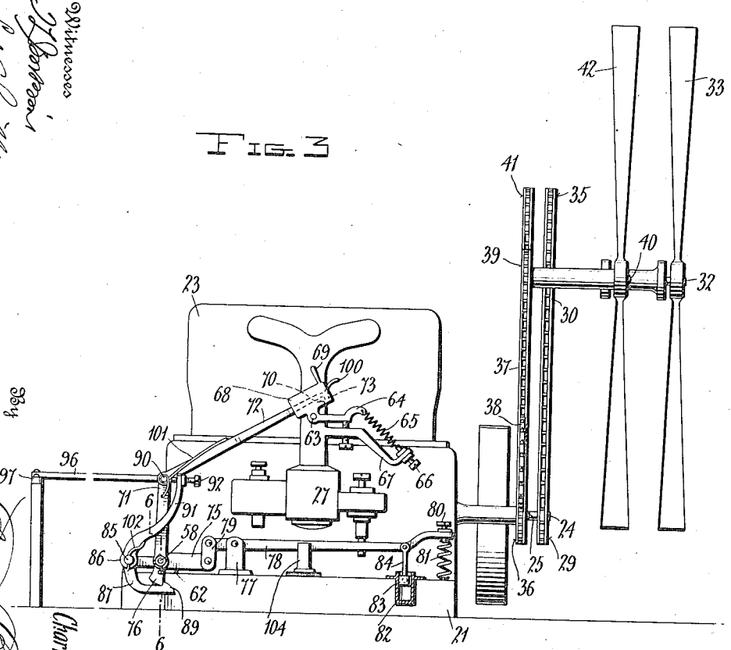
Figure 4:
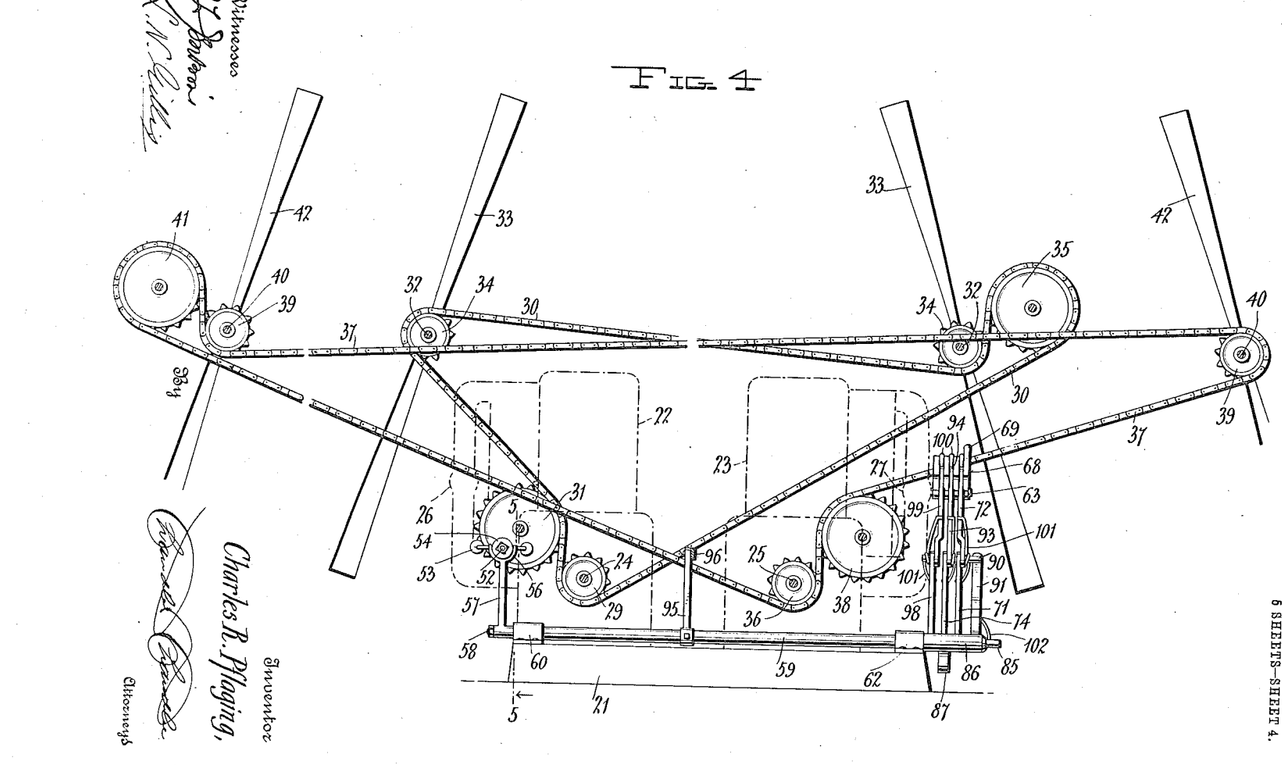
Fig. 4 is a rear elevation of the power plant.
Figure 5:
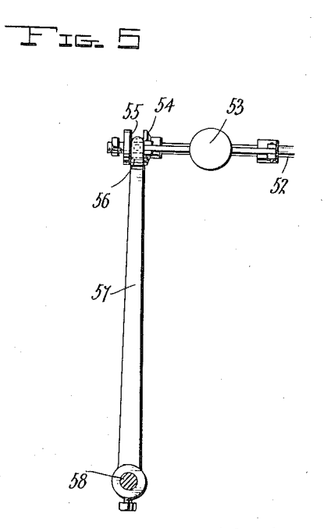
Fig. 5 is an enlarged detail section on the line 5—5 of Fig. 4.
Figure 6:
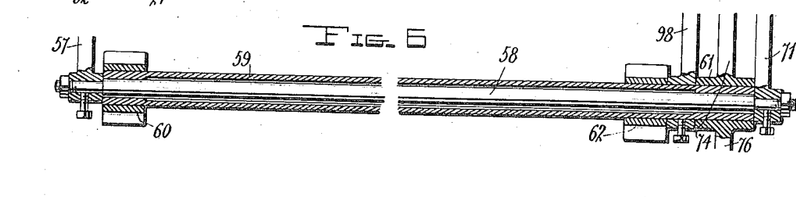
Fig. 6 is an enlarged detail section on the line 6—6 of Fig. 3.

The numeral 20 indicates an aeroplane and it is to be understood that the machine here shown is intended to be typical of any device of this character inasmuch as with minor changes in the form and proportions of the various parts of a power plant the same may be adapted, without varying from the principles of the invention, to any type of aeroplane or may be used, if desired, in connection with flying machines provided with a gas bag.

Mounted on a suitable base 21 in any convenient position on the aeroplane is a main motor 22 and an auxiliary motor 23. The motor 22 is provided with the usual crank shaft 24 while the motor 23 is provided with a crank shaft 25. These motors are intended to be of the usual type of internal combustion engine and may be of any preferred form. The motor 22 is provided with a carbureter 26 while the motor 23 is provided with a carbureter 27. The motors, their crank shafts, and carbureters may be of any preferred type as may also the magnetos 28 which serve to supply the necessary current and which are driven in any preferred manner from the respective motors.

In the preferred form of the propeller arrangement the motor 22 has upon its crank shaft a sprocket 29 around which passes a sprocket chain 30. A suitable idler 31 is positioned near the sprocket 29 for the purpose of insuring sufficient contact between the sprocket chain 30 and said sprocket 29. Mounted on the frame of the aeroplane 20 is a pair of spaced propeller shafts 32 each of which is provided with a propeller 33 and a sprocket 34. Adjacent one of the sprockets 34 is an idler 35 and the sprocket chain 30 is led around the sprocket 29, passing under said sprocket, over the idler 31, around and over one sprocket 34, under the other sprocket 34, over the idler 35, and back to the sprocket 29. By this arrangement the two propeller shafts 32 are caused to rotate in opposite directions so that the propellers 33 may also rotate in opposite directions as is common in aeroplanes.

The motor 23 is provided with a sprocket 36 on its crank shaft which serves to drive a sprocket chain 37. An idler 38 similar to the idler 31 is also provided for the sprocket chain 37 and this chain is led, in a manner similar to the chain 30, around sprockets 39 carried on propeller shafts 40 and an idler 41. On the propeller shafts 40 are located the auxiliary propellers 42 and it is preferred that the shafts 40 be situated outside of the shaft 32.

Figures 7, 8, 9, 10:
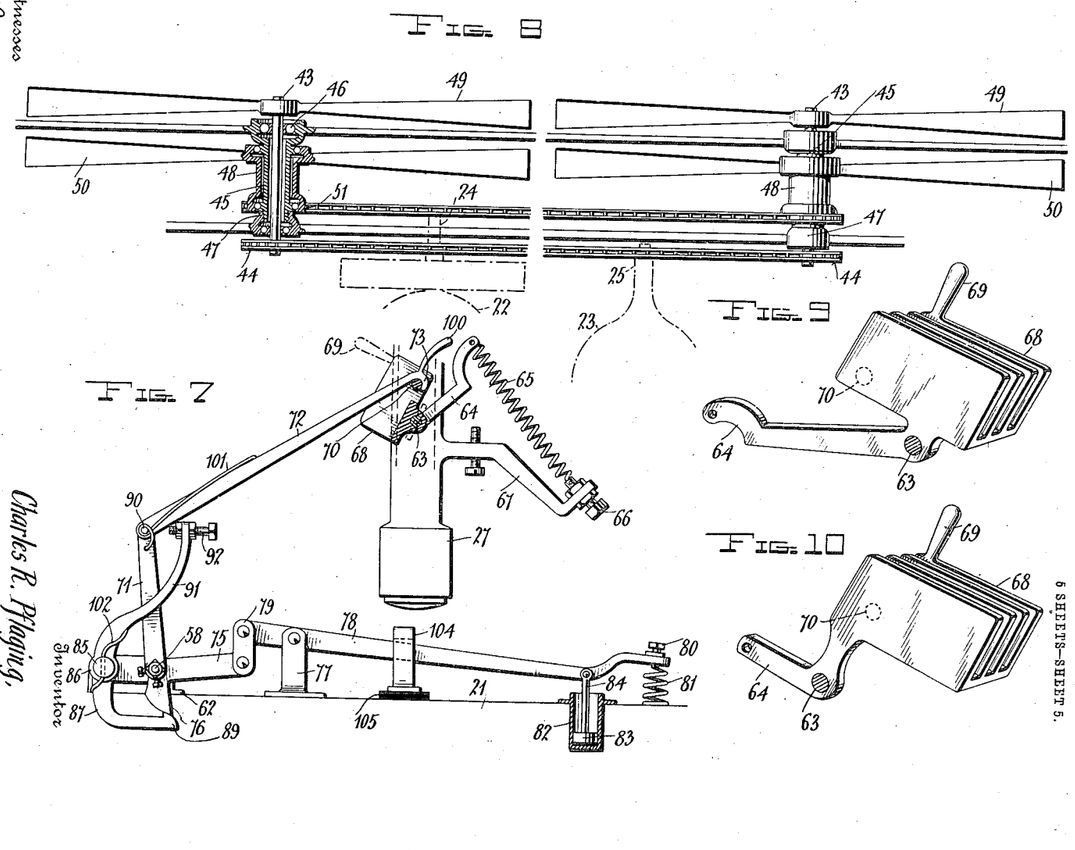
Fig. 7 is an enlarged detail view of a portion of the right hand end of the power plant, the parts being shown in the position assumed when the main motor is out of service.
Fig. 8 is a detail showing a modification of the propeller arrangement.
Fig. 9 is a detail perspective view of certain parts connected to the throttle of the auxiliary motor.
Fig. 10 is a view similar to Fig. 9 but showing a modification of the parts disclosed in said figure.

In the modified form of the invention as disclosed in Fig. 8 the propellers are arranged in two pairs, the propellers of each pair being in tandem arrangement. In this form of the device the shafts 40 are replaced by shafts 43 driven by sprockets 44 around which runs the chain 37 actuated by the motor 23. These shafts 43 are carried in sleeves 45 provided with ball bearings 46 which serve to support the shafts 43. One end of each sleeve is secured to the body by a screw connection as indicated at 47. Rotatable on each of the sleeves 45 are propeller sleeves 48 which take the place of the shafts 32. On the shafts 43 are propellers 49 while on the sleeves 48 are propellers 50. The sleeves 48 are also provided with sprockets 51 which are driven by means of the chain 30, the latter being actuated by the motor 22.

It will be noted from the foregoing that the operation of the motor 22 will actuate the propellers 33 or the propellers 50 according to the propeller arrangement used, while the motor 23 will actuate either the propellers 42 or the propellers 49, depending in like manner on the arrangement. Now, if the propellers 33 or 50 be used to drive the aeroplane it will be seen that a load is thrown on the motor 22 while if the other propellers are used the load will be thrown on the motor 23.

At 52 is a shaft which is operatively connected by any suitable means to the shaft 24 of motor 22. This shaft may, if desired, be the cam shaft, or may be independent and driven separately by the motor 22. On this shaft 52 is a governor 53, preferably of the ball type, and the movement in and out of the balls of this governor causes a sleeve 54, connected to the balls, to move longitudinally of the shaft 52. This sleeve 54 is provided with a fork receiving groove 55 wherein is held the forked end 56 of a lever 57. This lever 57 is mounted on a shaft 58 so that as the speed of the motor 22 increases the upper end of the lever 57 will be drawn toward the motor or inward, while when the speed decreases this upper end will be forced away from the motor or outward. The lever 57 being fixed upon the shaft 58 will cause said shaft to rotate in accordance with the movement of said lever. On the shaft 58 is carried a sleeve 59 one end whereof is journaled in a suitable bearing 60 upon the base 21, the other end being journaled in a bearing 62 on said base. On the sleeve 59 is a second sleeve 61. The sleeve 59 extends through the sleeve 61 at the right hand side of the machine and the shaft 58 extends beyond the sleeve 59 upon this side of the machine.

The carbureter 27 of the motor 23 is provided with the usual throttle whereof the stem is indicated at 63. Secured to this stem are certain parts which are best seen in their preferred form in Fig. 7 and in their modified form in Fig. 10. In each of these forms there is provided an arm 64 one end whereof is fixed to the stem 63 while to the other end of this arm is attached one end of a spring 65 which has its opposite end connected to a tension screw 66 carried by an arm 67 formed on the carbureter. To the stem 63 is also attached a casting of channel or trough shape and indicated at 68. This casting is provided with a handle 69 so that it may be grasped and rotated to open or close the throttle of the carbureter 27. Between the sides of the channel shaped member 68 extends a bar 70. Upon the right hand end of the shaft 58 is carried a lever 71 which extends upward and upon which is pivoted one end of an arm 72 provided at its free end with a hook 73 normally engaging the bar 70.

It is to be understood that in the operation of this invention both the motor 22 and the motor 23 will be normally in motion so that the throttle of the carbureter 27 will at all times be at least partially open. It is also to be noted that the motor 22 is normally run at such rate of speed as to carry the load due to driving the aeroplane by its propellers 33, while the propellers 42 are to be run by the motor 23 only at such rate of speed as will eliminate the resistance which would exist if the aeroplane was driven through the air with these propellers standing still. When the modification of the propeller arrangement shown in Fig. 8 is adopted the motor 22 will still be run at the proper rate of speed to carry the load due the propellers 50, while the motor 23 will only be used to keep down the resistance of the propellers 49.

Now, in the operation of the invention as thus far described, let it be supposed that the two motors are running in their normal condition, that is to say, motor 22 loaded and motor 23 unloaded. If the motor 22, for any reason, either stops or slows down the governor will cause the end of the lever 57 to move outward and this in turn will move the lever 71, outward, thus causing the hook arm 72 to pull upon the bar 70 and open the throttle controlled by the stem 63. The motor 23 will immediately begin to take up the load and so long as the motor 22 runs below its proper rate of speed the motor 23 will operate. If the motor 22 stops entirely the action of the governor will throw the throttle of the motor 23 open to such an extent that the motor 23 will carry the entire load, but if the motor 22 merely slows up momentarily and again picks up its speed the action of the governor will move the hook arm 72 in such direction that the spring 65 will again close off the throttle to the proper extent necessary to permit the motor 23 running at its normal rate of speed, this being at such rate as to merely eliminate the resistance of the propellers connected to said motor 23.

Upon the sleeve 61 is secured a lever 74. This lever 74 is provided with an arm 75 extending inward toward the carbureter 27 and a downwardly extending arm 76 having a beveled end as can clearly be seen by reference to Fig. 7. Fixed upon the base 21 is a standard 77 wherein is pivoted a lever 78 one end of which is connected by a link 79 to the arm 75. The other end of this lever carries a tension screw 80 to which is attached one end of a tension spring 81, the other end being secured to the base 21. Adjacent the end of the lever 78 to which the spring 81 is attached is a dash-pot 82 provided with the usual piston 83 and stem 84, the latter being connected to the lever 78. Carried in suitable bearings on the base 21 is a shaft 85 whereon is mounted a sleeve 86 provided with an arm 87 having a hooked end 89 which normally engages with the arm 76 of the lever 74. The normal position of the parts just described can be seen by reference to Fig. 3 and it will there be noted that the engagement of the hooked end 89 with the lever arm 76 prevents movement of the lever 74 outward and restrains it from assuming the position indicated in Fig. 7. Upon the upper end of the lever 71 is a pin 90 and extending upward from the sleeve 86 is an arm 91, the upper end of which lies in the path of the pin 90 and is provided with an adjusting screw 92 so that the amount of movement inward of the lever 71 may be regulated before contact is made between the pin 90 and the screw 92. Upon the lever 74 is pivoted one end of a hook arm 93 provided with a hooked end 94 which engages over the bar 70.

Let it be supposed that the motors 22 and 23 are again at their normal speeds as previously described. Now, if anything occurs which causes the motor 22 to speed up, as for instance if the sprocket chain 30 breaks or becomes displaced, the governor will cause the lever 57 to move inward. This will move the lever 71 in the same direction and the pin 90 will come in contact with the screw 92 and rotate the sleeve 86 so as to cause the hooked end 89 of the arm 87 to disengage from the lever arm 76. When this occurs the spring 81 will draw that end of the lever 78 to which it is attached downward. This will move the upper end of the lever 74 outward and cause the hook arm 93 to pull against the bar 70 and open the throttle of the motor 23. This will, of course, throw the load on to this motor. It will thus be seen from the foregoing that no matter whether the motor 22 exceeds its proper speed or drops below its proper speed the motor 23 will pick up the load so that this motor is always in reserve so long as the motor 23 runs within the speed limits for which it is set.

In order to control the motor 23 by hand the sleeve 59 has attached thereto a lever 95 which may be connected by a suitable link 96 to a hand or foot lever 97 conveniently located to the operator. On this sleeve is also carried a lever 98 to the upper end of which is attached a hook arm 99 similar in all respects to the hook arms previously described. Each of the hook arms is similarly equipped with a hand grip 100 which may be used to disengage the respective hook arm from the bar 70, and these arms are also provided with springs 101 which normally keep them in engagement with said bar. The arms 87 and 91 are also equipped with a suitable spring 102 normally serving to hold them in the position indicated in Fig. 3.

When the motor 22 speeds up because of the load being removed for any reason it is necessary that, when the motor 23 assumes the load, the motor 22 should cease from operation. In order to accomplish this a wire 103 is led from one pole of the magneto 28 of motor 22 to a contact member 104 mounted on a base 105 of insulating material. This contact member is secured to the base 21 in such position as to lie in operative relation to the lever 78. The contact member 104 is of inverted J-shape and the hook end of the J bears against the lever 78 when the latter is in the position indicated in Fig. 3 but when the arm 76 has been released and the lever 78 assumes the position shown in Fig. 7 this hook end will be out of contact with said lever, the lever dropping below the lower end of the hook. This wire 103 is the ground wire for the magneto 28, being that usually connected direct to the cylinder or base of an engine of this type. It is obvious that the other wire from the magneto will be connected to a sparker of some form as indicated at 106. Under normal circumstances when the motor 22 is carrying the load the magneto 28 will be in operation. If the motor 22 stops the magneto will likewise stop but if the motor 22 speeds up the lever 78 will assume the position shown in Fig. 7. Now, with the normal running of the motor 22 a current will flow from the magneto through the wire leading to the sparker 106, across the terminals of the sparker to the frame of the engine, through the frame of the engine to the support 77 and lever 78, to the contact 104 and back through the wire 103 to the magneto. Just as soon as the lever 78 is released by the speeding up of the motor 22 this current will be broken by the separation of said lever and the contact 104. When the current is broken there will be no spark passing between the terminals of the sparker 106 and in consequence the motor 22 will stop.

It will be seen from the foregoing that the motor 22 cannot drop below or exceed certain predetermined speed limits without the load being taken off of said motor 22 either by the motor stopping or by interruption of the spark current. It will also be plain that whatever irregularity occurs in the operation of the motor 22 the same will have the effect of placing the load on the motor 23 and this without manual interference of any sort.

There has thus been provided a simple and efficient device of the kind described and for the purpose specified.

From the foregoing it will be noted that in the event of a propeller blade breaking, the No. 1 or normally driving motor will speed up. This increase of speed will effect an opening up of the carbureter of the No. 2 motor so that its propeller or propellers will be operated at a speed sufficient to drive the apparatus. By properly setting the mechanism, the first motor may be entirely cut out under these conditions when the second motor will take up the entire driving load. Again, if the work done by the No. 1 propellers is decreased by clogging of the carbureter of their motor, the No. 2 propellers or second series of propellers will gradually speed up to take the load repudiated by the first set and if the carbureter of the first motor clears itself, the first set of propellers will take up the propelling load while the second set of propellers will correspondingly give up the propelling load. There is thus provided an automatic means for transferring to the second system of propellers whatever part of the propelling load the first set of propellers may fail to take care of.

Having thus described the invention, what is claimed as new, is:—

1. In a device of the kind described, separate propellers, a motor for each propeller and means actuated by one motor for automatically increasing and decreasing the speed of the other motor inversely to the increasing and decreasing speed of the first motor at any stage of load of the first motor.

2. In a device of the kind described, a pair of motors, and means controlled by one of said motors to automatically bring the other motor into service and stop the controlling motor when the first mentioned motor exceeds a predetermined speed limit.

3. The combination with a normally loaded motor, of a normally unloaded motor, both motors being adapted for simultaneous operation, and automatic means for loading the normally unloaded motor when the normally loaded motor exceeds or drops below predetermined speed limits.

4. The combination with a normally loaded motor, of a normally unloaded motor, both motors being adapted for simultaneous operation, and automatic means for loading the normally unloaded motor and stopping the normally loaded motor when the latter exceeds a predetermined speed limit.

5. The combination of a normally loaded motor, a normally unloaded motor, both motors being adapted for simultaneous operation, and automatic means for loading the normally unloaded motor when the normally loaded motor exceeds or drops below predetermined speed limits, said means including a cut-out mechanism controlling the normally loaded motor and arranged to stop said motor when the latter exceeds a predetermined speed limit.

6. The combination of a pair of internal combustion motors, a sparker for one of said motors, an electric circuit including said sparker, a throttle for the other motor, and a controlling device actuated from the first motor to open the throttle and break said circuit automatically when the first mentioned motor exceeds a predetermined speed limit.

7. The combination of an internal combustion motor, a sparker for said motor, a circuit including said sparker, a governor actuated by said motor, a second motor, a throttle for said second motor, a connection between said governor and throttle arranged to open the throttle when the first motor drops below a predetermined speed limit, a second throttle opening device including a latch normally holding said device inoperative, means on the connection from the governor arranged to contact with and release the latch when the first motor exceeds a predetermined speed limit, and a circuit breaker included in said circuit and arranged to be opened when said latch is released.

8. The combination of a motor, a governor actuated by said motor, a shaft, a lever on said shaft connected to said governor, a second motor, a throttle controlling the second motor, a stem for said throttle, a handle on said stem provided with a bar constituting a crank handle, a second lever on said shaft, and a hook provided arm pivoted to the end of the second lever and arranged to open the throttle when the first motor drops below a predetermined speed limit.

9. The combinatiton of a motor, a governor actuated by said motor, a shaft, a lever on said shaft connected to said governor, a second motor, a throttle controlling the second motor, a stem for said throttle, a handle on said stem provided with a bar constituting a crank handle, a second lever on said shaft, a hook provided arm pivoted to the end of the second lever and arranged to open the throttle when the first motor drops below a predetermined speed limit, and means to restore said throttle to its former position when the first motor resumes its normal speed.

10. The combination of a motor, a governor actuated by said motor, a shaft, a lever on said shaft connected to said governor, a sleeve freely revoluble on said shaft, a second motor, a throttle controlling the second motor and provided with a stem, means carried by the stem to move said throttle and including a bar constituting a crank handle, a lever on said sleeve, an arm having one end pivoted to the lever and having a hook at its other end adapted for engagement with said bar, means constantly urging said sleeve supported lever to rotate and open said throttle, a latch normally holding said sleeve supported lever from rotation, a second lever on said shaft, and a bar projecting from the second lever and engaging said latch to release said sleeve supported lever when the first motor exceeds a predetermined speed limit.

11. The combination of an internal combustion motor, a governor actuated by said motor, a shaft, a lever on said shaft connected to said governor, a sleeve freely revoluble on said shaft, a second internal combustion motor, a throttle controlling the second motor and provided with a stem, means carried by the stem to move said throttle and including a bar constituting a crank handle, a lever on said sleeve, an arm having one end pivoted to the lever and having a hook at its other end engaging said crank handle bar, means constantly urging said sleeve supported lever to rotate and open said throttle, a latch normally holding said sleeve supported lever from rotation, a second lever on said shaft, a pin projecting from the second lever and engaging said latch to release said sleeve supported lever when the first motor exceeds a predetermined speed limit, a sparker for said first motor, a circuit including said sparker, and a normally closed circuit breaker opened by the movement of the lever rotating means when the lever is released from the latch.

12. The combination of an internal combustion motor, a governor actuated by said motor, a shaft, a lever on said shaft connected to said governor, a sleeve freely revoluble on said shaft, a second internal combustion motor, a throttle controlling the second motor and provided with a stem, means carried by the stem to move said throttle and including a bar constituting a crank handle, a lever on said sleeve, an arm having one end pivoted to the lever and having a hook at its other end engaging said crank handle bar, means constantly urging said sleeve supported lever to rotate and open said throttle, a latch normally holding said sleeve supported lever from rotation, a second lever on said shaft, a pin projecting from the second lever and engaging said latch to release said sleeve supported lever when the first motor exceeds a predetermined speed limit, a sparker for said first motor, a circuit including said sparker, a normally closed circuit breaker opened by the movement of the lever rotating means when the lever is released from the latch, and a second hook arm on the second shaft supported lever and having its hooked end engaged with the crank handle to open said throttle when the first motor drops below a predetermined speed limit.

13. The combination of an internal combustion motor, a governor actuated by said motor, a shaft, a lever on said shaft connected to said governor, a sleeve freely revoluble on said shaft, a second internal combustion motor, a throttle controlling the second motor and provided with a stem, means carried by the stem to move said throttle and including a bar constituting a crank handle, a lever on said sleeve, an arm having one end pivoted to the lever and having a hook at its other end engaging said crank handle bar, means constantly urging said sleeve supported lever to rotate and open said throttle, a latch normally holding said sleeve supported lever from rotation, a second lever on said shaft, a pin projecting from the second lever and engaging said latch to release said sleeve supported lever when the first motor exceeds a predetermined speed limit, a sparker for said first motor, a circuit including said sparker, a normally closed circuit breaker opened by the movement of the lever rotating means when the lever is released from the latch, a second hook arm on the second shaft supported lever and having its hooked end engaged with the crank handle to open said throttle when the first motor drops below a predetermined speed limit, and means to restore said throttle to its former position when the first motor resumes its normal speed after dropping below the lower speed limit.

In testimony whereof, I affix my signature, in presence of two witnesses.

CHARLES R. PFLAGING.

Witnesses:
I. J. NIVER,
H. G. PALLITZ.